United States Patent
Vergeest

(10) Patent No.: US 6,951,425 B2
(45) Date of Patent: Oct. 4, 2005

(54) OPTICAL FERRULE-LESS CONNECTOR

(75) Inventor: Henricus Vergeest, Mountain View, CA (US)

(73) Assignee: Tyco Electronics Nederland B.V. (NL)

( * ) Notice: Subject to any disclaimer, the term of this patent is extended or adjusted under 35 U.S.C. 154(b) by 0 days.

(21) Appl. No.: 10/415,161
(22) PCT Filed: Oct. 25, 2001
(86) PCT No.: PCT/US01/47694
§ 371 (c)(1), (2), (4) Date: Apr. 25, 2003
(87) PCT Pub. No.: WO02/056060
PCT Pub. Date: Jul. 18, 2002

(65) Prior Publication Data
US 2004/0071407 A1 Apr. 15, 2004

Related U.S. Application Data
(60) Provisional application No. 60/242,997, filed on Oct. 25, 2000, and provisional application No. 60/243,275, filed on Oct. 25, 2000.

(51) Int. Cl.[7] .................................................. G02B 6/38
(52) U.S. Cl. ........................................................ 385/59
(58) Field of Search ......................... 385/58–60, 55–56, 385/69–71, 88–89, 92, 98

(56) References Cited

U.S. PATENT DOCUMENTS 5,469,522 A * 11/1995 Fan ............................... 385/98

* cited by examiner

Primary Examiner—Javaid H. Nasri

(57) ABSTRACT

An optical connector for optically coupling a fiber to an optical pathway of a mating component when in a mated state, the connector comprising: (a) a housing having a front end portion and a back end portion, the housing having at least one passageway extending from the back end portion to the front end portion to accommodate at least one fiber, the housing defining a cavity along a first portion of the passageway such that a fiber in the passageway is deflected into the cavity when the connector is in the mated state; (b) a barrier along a second portion of the passageway, the barrier preventing a fiber from being deflected into the second portion when the connector is in the mated state; (c) a fiber retainer at the back end portion, the fiber retainer adapted to restrict a fiber's backward movement with respect to the housing when in the mated state; and (d) the front end portion being configured to mate with an alignment member such that a fiber in the passageway is received within a passage of the alignment member, the front end having a first end face having an opening through which the passageway extends such that a fiber in the passageway is supported at the back end portion by the fiber retainer and at the front end portion by the end face and is deflected between the front and back end portions during mating.

39 Claims, 6 Drawing Sheets

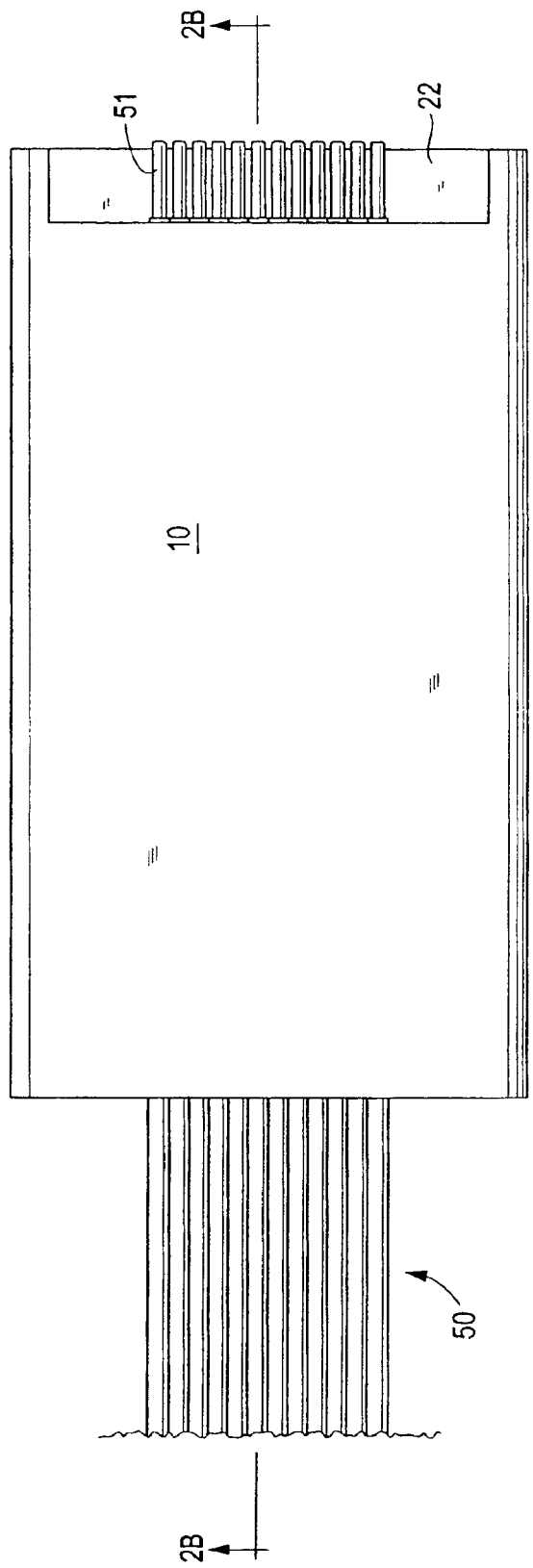
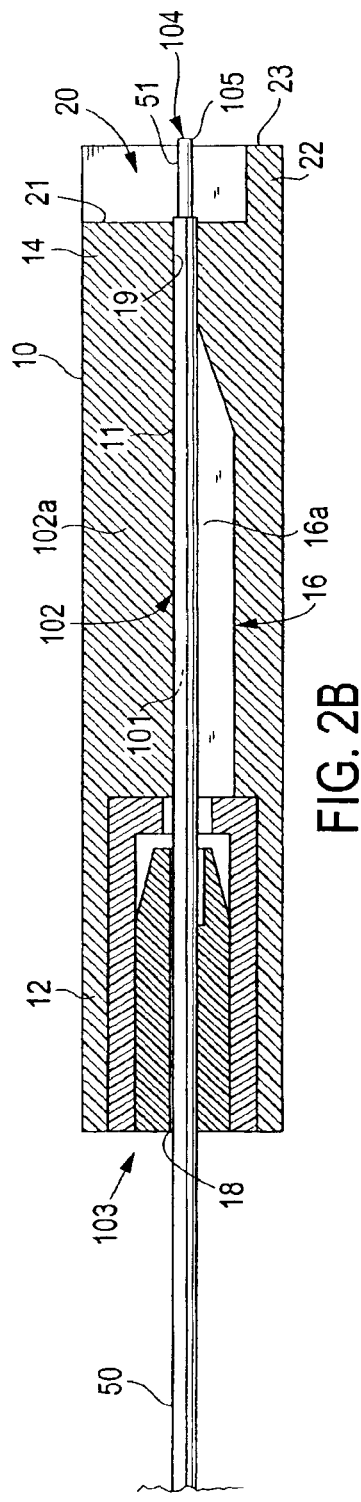
FIG. 2A
FIG. 2B

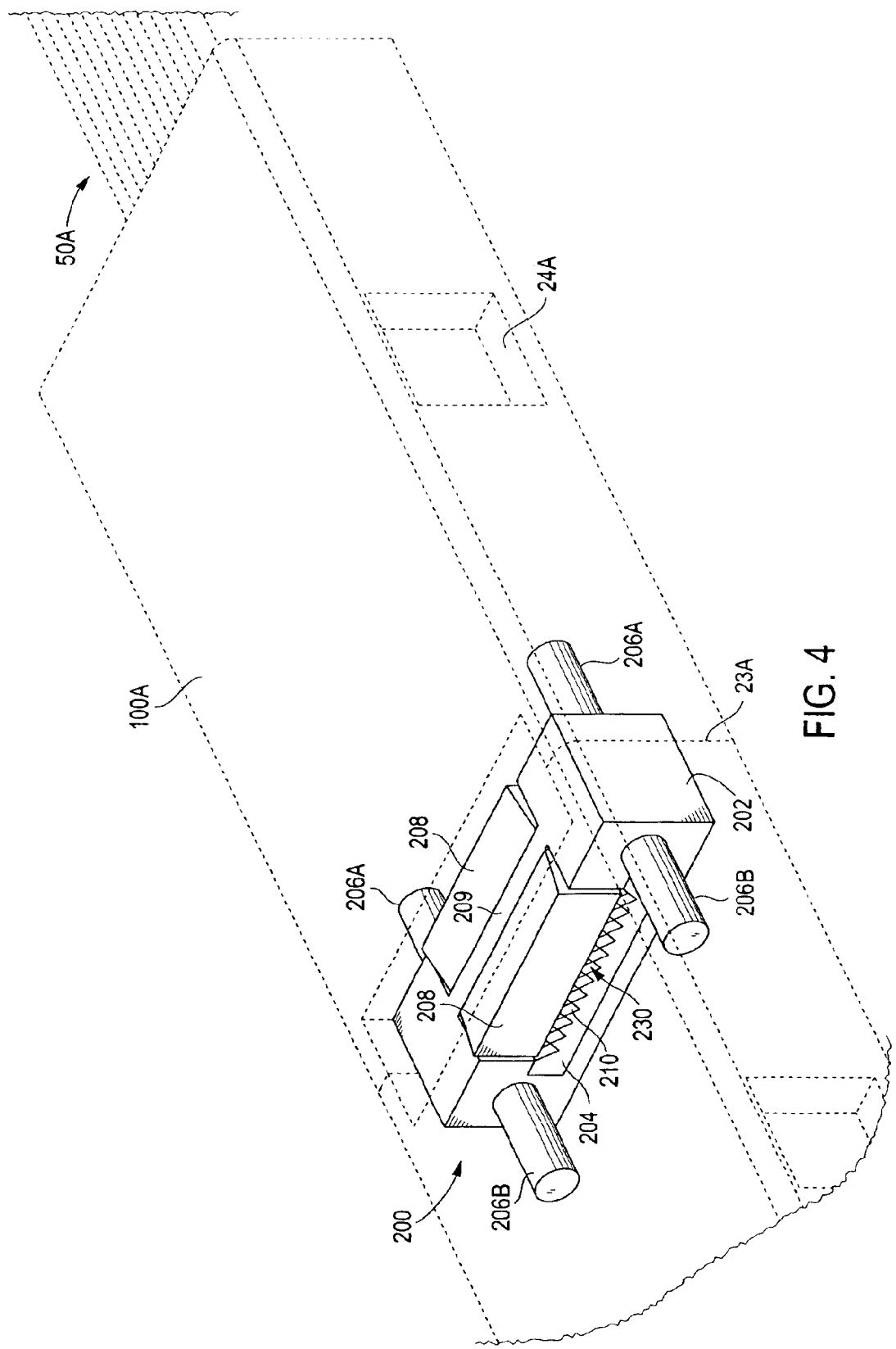

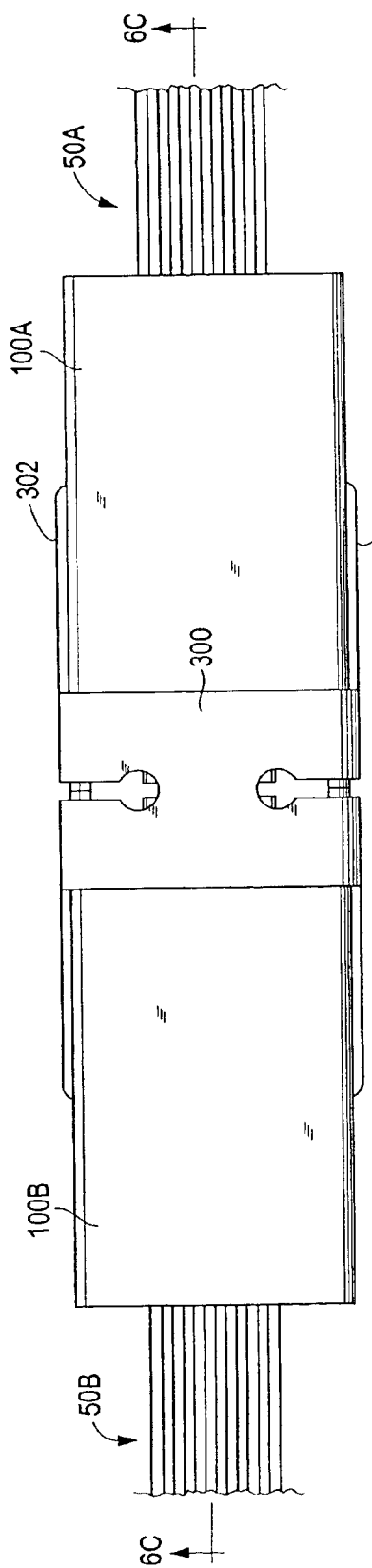
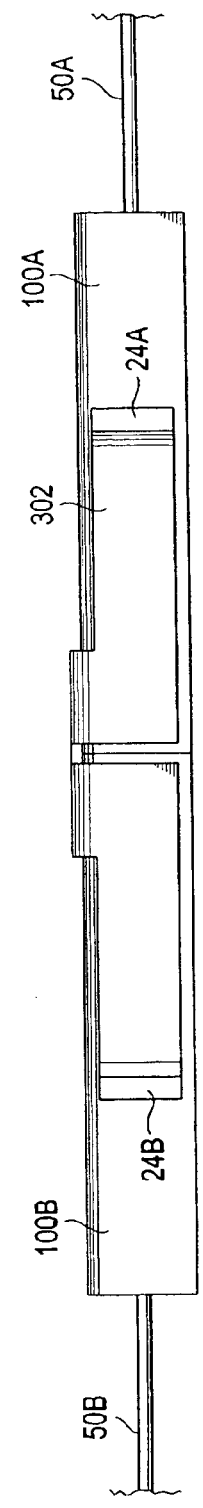
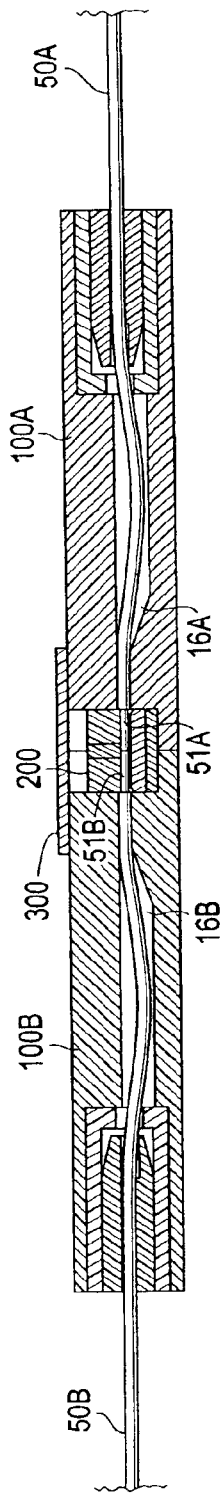
FIG. 6A
FIG. 6B
FIG. 6C

OPTICAL FERRULE-LESS CONNECTOR

CROSS REFERENCE TO RELATED APPLICATIONS

This application is a U.S. national stage application based on International Application No. PCT/US01/47694, filed Oct. 25, 2001, which claims priority to U.S. Provisional Application Nos. 60/242,997, filed Oct. 25, 2000, and 60/243,275, filed Oct. 25, 2000.

FIELD OF INVENTION

The present invention relates generally to optical connectors, and, more specifically, to ferrule-less optical connectors.

BACKGROUND OF INVENTION

Optical fiber connectors are an essential part of substantially all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of an optical fiber connector is to hold a fiber end such that the core of the fiber is axially aligned with the optical pathway of the component to which the connector is mating (e.g., another fiber, a waveguide, an opto-electric device). This way, all of the light from the fiber is optically coupled to the other component. It is well known that to effect optical coupling and minimize Fresnel loss, there must be sufficient "physical contact" between the optical pathway medium, which, in the case of optical connectors, is generally fiber.

To effect physical contact, traditionally optical connectors have employed "ferrules." Ferrules are well-known components which hold one or more fibers such that the end faces of the fibers are presented for optical coupling. Ferrule connectors typically bias the ferrule forward such that, when the connector is mated to another connector or mating component, a mating face of the ferrule urges against the mating component to physically contact the fiber end faces with the optical pathway of the mating component. Although ferrules generally facilitate good fiber manageability and result in connections with low Fresnel losses, the ferrule itself has a number of shortcomings.

One such shortcoming is the need to polish the mating face of the ferrule to exacting parameters to ensure physical contact is made with the mating component. Polishing with such stringent requirements tends to be costly and prone to reworking and waste, thereby lowering yields. The problems associated with polishing the ferrule are exasperated in multi-fiber ferrules which are more complicated to polish.

Another shortcoming of using a ferrule in an optical connector is its inherent bulk that must be accommodated within the connector. To provide a purchase point for the fiber and adequately protect the fiber end, most ferrules have a certain amount of bulk which must be accommodated by the connector. In single fiber ferrules, this bulk can negatively affect the minimum center line distance between fibers, which is particularly problematic as the need for fiber density increases.

Given the shortcomings of ferrule connectors, there has been an effort underway to develop ferrule less-type connectors. For example, U.S. Pat. No. 5,694,506, Kobayashi et al., discloses a number of different single-fiber and multi-fiber ferrule-less connector approaches. The disclosed approaches, however, have a number of shortcomings which have militated against their use and general acceptance. First, most of the disclosed approaches rely on a fiber being fixed to one end of a connector while the free end of fiber is cantilevered. A cantilevered fiber, however, is very delicate and easily damaged. Furthermore, the cantilevered portion is "bare fiber" meaning that its protective coating has been stripped, thus rendering the cantilevered fiber even more susceptible to damage.

The applicants have also recognized that the approaches disclosed in Kobayashi et al. do not offer sufficient control over the buckling of the cantilevered end. Specifically, the fiber is allowed to buckle in any radial direction and to a fairly significant degree. The applicants have identified a number of problems associated with this uncontrolled buckling. First, in multi-fiber assemblies, the buckled fibers are likely to interfere with each other thereby resulting in an uneven pressure at the fiber end face interface. Additionally, and perhaps more important, the ability of the fibers to buckle in any radial direction may cause their end faces to rotate. If an end face is physically contacting the mating optical pathway, this rotation may serve to scratch the fiber and/or optical pathway. As is well known, scratches on the end face of a fiber or wave guide drastically diminish its optical performance and ability to optically couple.

The applicants have also identified that another problem with the approaches of Kobayashi et al. is the use of micro holes in the alignment member. Micro holes tend to be problematic when interfacing a fiber to an optical device such as a laser diode or photo detector. Specifically, optical devices typically require very precise alignment, often with a tolerance of less than one micron. Micro holes necessarily require a certain amount of tolerance such that the fiber can be slid through the hole. Furthermore, if dust or other debris is in the hole it will likely force the fiber to one side of the hole therefore creating misalignment to the full extent of the tolerance. This misalignment may be beyond the allowable tolerance of the optical coupling between the fiber and optical device.

Aside from their inaccuracy, micro holes are also difficult to apply to devices. Specifically, most optical devices are mounted on a substrate which is precision etched to receive the device and may have electrical traces and the like to couple the device to a larger system. It is not common to prepare micro holes on substrates upon which optical devices are mounted since micro holes generally are regarded as not having an accuracy sufficient for optical coupling optical devices. Consequently, the techniques and apparatus to perform this function are, for the most part, undeveloped. Thus, it is likely to be expensive and time consuming to prepare optical device substrates with micro holes for coupling to the ferrule-less connector as disclosed in Kobayashi et al.

In U.S. Pat. No. 6,086,263, Selli et al., an approach for optically coupling a fiber to an optical device without the use of a ferrule is disclosed. Specifically, the disclosed approach uses a V-Groove adjacent and aligned with the optical device and a fiber which is contacted with said V-Groove at an angle and is pushed forward with sufficient axial force so as to create a slight buckle in the fiber. This buckle provides the desired force for maintaining the fiber's physical contact. Although this approach exploits V-Groove technology, which is common in the preparation of substrates for optical devices, the need to direct a bare fiber into the groove at a specific angle has several problems which have limited the use and general acceptance of this approach. Specifically, the approach requires that a bare fiber be used and bent. A bare fiber, however, is, by its very nature, fragile and subject to damage. Additionally, because the fiber contacts the V-Groove at an angle as it is slid forward to mate with the optical device, it is difficult to prevent the end face of the fiber from skiving the V-Groove. Skiving the V-groove diminishes its alignment capabilities and creates debris which can interfere with the optical coupling between the fiber end face and the optical device. Furthermore, maintaining the fiber at the correct angle with respect to the V-Groove results in an awkward arrangement which complicates packaging, especially for small form factor applications which are becoming popular as the desire to increase fiber density increases.

Therefore, there is a need for a ferrule-less optical connector that avoids the problems of the prior art. The present invention fulfills this need among others.

SUMMARY OF INVENTION

The present invention provides a connector for optically coupling a fiber to an optical pathway of another optical component without the use of a ferrule while overcoming the problems of the prior art. More specifically, the optical connector of the present invention introduces one or more features that control the position of the fiber in the connector's mated and unmated states.

One such feature is a structure which controls the buckling direction of the fiber(s) during the mating of the connector. By controlling the direction in which a fiber buckles, the connector of the present invention can restrict the buckling of the fiber to a particular radial region. This is an advantageous feature over prior art connectors in which the fiber was free to buckle in any radial direction. Restricting the buckling to a particular radial region minimizes the torsional rotation of the fiber end as the connector is mated. As mentioned above, this torsional rotation can cause the end face of the fiber to rotate with respect to the mating optical pathway and possible be scratched. Eliminating this rotation eliminates this potential for scratching. Another advantage of restricting the buckling to a particular radial region is that adjacent fibers in a multi-fiber connector do not interfere with one another during mating. Since interference between buckling fibers is minimized, the connector of the present invention promotes consistent and repeatable physical contact pressure among all the fibers.

Therefore, according to one embodiment of the invention, a ferrule-less optical connector is provided which comprises: (a) a housing having a front end portion and a back end portion, the housing having at least one passageway extending from the back end portion to the front end portion to accommodate at least one fiber, the housing defining a cavity along a first portion of the passageway such that a fiber in the passageway is deflected into the cavity when the connector is in the mated state; (b) a barrier along a second portion of the passageway, the barrier preventing a fiber from being deflected into the second portion when the connector is in the mated state; (c) a fiber retainer at the back end portion, the fiber retainer adapted to restrict a fiber's backward movement with respect to the housing when in the mated state; and (d) the front end portion being configured to mate with an alignment member such that a fiber in the passageway is received within a passage of the alignment member.

Another fiber control feature of the connector of the present invention is a housing configuration in which the fiber is supported at both ends of the connector in its unmated state. Specifically, rather than having the fiber cantilevered as in the prior art, the connector of the present invention supports the fiber on both sides of where the fiber buckles. By holding the fiber on both ends in fixed positions relative to the housing, the fiber can be pre-aligned with precision alignment means such as V-grooves. As mentioned above, V-grooves are preferred over micro holes for their high precision. As is well known, a V-groove contacts a fiber at two points and provides very accurate alignment along the x and y axes. Furthermore, V-grooves are used extensively in the substrates of optical devices such as laser diodes and photodetectors. Thus, by providing a connector which interfaces with V-grooves, the use of the connector of the present invention naturally extends from coupling with like connectors to coupling with optical devices. Another advantage of supporting the fiber on either end of the buckle is that it provides for a more robust connector—there is not a fragile cantilevered section of bare fiber exposed which can be easily damaged as in the prior art.

Thus, according to another embodiment of the invention, a ferrule-less optical connector is provided which comprises (a) a housing having a front end portion and a back end portion, the housing having at least one passageway extending from the back end portion to the front end portion to accommodate at least one fiber; (b) a fiber retainer at the back end portion, the fiber retainer adapted to restrict a fiber's backward movement with respect to the housing when in the mated state; and (c) the front end comprising a first end face fixed in position relative to the housing, the first end face having an opening through which the passageway extends such that a fiber in the passageway is supported at the rear end by the fiber retainer and at the front end portion by the end face, the front end also comprising an alignment structure for cooperating with an alignment member such that a fiber in the passageway is received within a V-groove of the alignment member.

Yet another fiber control feature of the present invention is axially aligning the fiber with the V-grooves. Specifically, the connector of the present invention preferably aligns the fiber with the V-groove such that the fiber does not assert a buckling force on the V-groove. Instead, the buckling force is exerted essentially axially along the fiber allowing it to be used essentially entirely for ensuring physical contact. It has also been found that by not imparting a force component into the V-grooves, skiving of the V-groove by the edges of the fiber end face during mating is minimized.

Accordingly, another embodiment of the connector is provided which comprises: (a) a housing having a front end portion and a back end portion, the housing having at least one passageway extending from the back end portion to the front end portion to accommodate a fiber, (b) a fiber retainer at the back end portion, the fiber retainer adapted to restrict a fiber's backward movement with respect to the housing when in the mated state; (c) the front end portion comprising a first alignment structure for cooperating with an alignment member such that a fiber in the passageway is received within a V-groove of the alignment member; and (d) an alignment member adjacent the front end portion and having a V-groove axially aligned with every fiber in the housing, the alignment member having a second alignment structure for aligning the V-groove with the optical pathway of the mating component.

In a preferred embodiment, two or more of the fiber control features mentioned above are combined into a common connector. More preferably, all of the fiber control features are combined in a common connector.

BRIEF DESCRIPTION OF THE DRAWINGS

The present invention will become more fully understood from the detailed description given hereinbelow and the accompanying drawings which are given by way of illustration only, wherein reference numerals designate corresponding parts in the various drawings and wherein:

FIG. 2A shows a top view of the optical connector of FIG. 1 and FIG. 2B shows a cross-sectional view of the optical connector, cut along line 2B—2B of FIG. 2A;

FIG. 4 shows a perspective view of an example of an alignment device of the optical assembly shown in FIG. 3;

FIGS. 6A and 6B respectively show top and side views of the optical assembly of FIG. 3 and FIG. 6C shows a cross-sectional view of the optical assembly, cut along line 6C—6C of FIG. 6A.

DETAILED DESCRIPTION OF THE PREFERRED EMBODIMENTS

The present invention provides for an optical ferrule-less connector having enhanced control over the fibers it contains during the mating process to ensure a reliable and repeatable physical contact ("PC") between the fibers of the connector and the optical pathways of a mating optical structure. The term "optical pathway," as used herein, refers to any medium for conducting optical signals including the following: a fiber or waveguide; a silica or polymeric structure in a substrate; or a silica or polymeric optical component. The term "mating component" refers to an optical package that contains or comprises the optical pathway. For example, a mating component may be another connector, herein a "mating connector" or it may be an optical device in which the mating optical pathway is an integral component. Examples of optical devices include passive devices, such as, add/drop filters, arrayed wave guide gratings (AWGs), splitters/couplers, and attenuators, and active devices, such as, optical amplifiers, transmitters, receivers and transceivers.

For illustrative purposes, the optical connector of the present invention is described below with respect to a multiple-fiber, fiber-to-fiber connector. It should be understood, however, that the invention may be practiced in a variety of applications, for example, the connector may be a single-fiber connector or the connector may be configured to mate to an optical device as described above.

Figure 1:
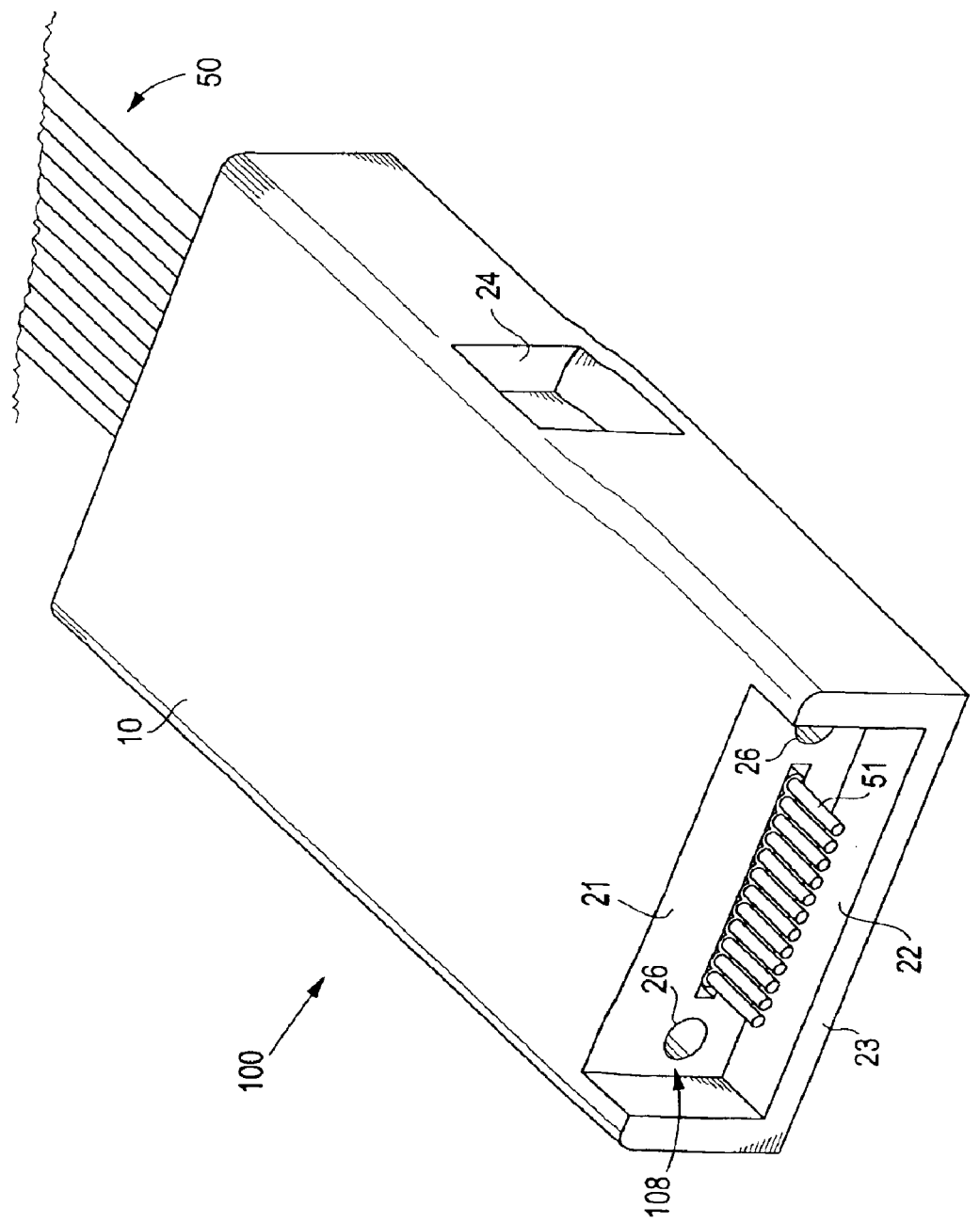
FIG. 1 shows a perspective view of an optical connector for optical fibers in accordance with a preferred embodiment of the present invention.

Referring to the drawings now, FIG. 1. shows a perspective view of an optical connector 100 for optical fibers according to a preferred embodiment of the present invention, FIG. 2A shows a top view of the optical connector 100, and FIG. 2B shows a cross-sectional view of the optical connector 100, cut along line 2B—2B of FIG. 2A.

As shown in FIGS. 1–2B, the optical connector 100 includes a housing 10 for holding a plurality of optical fibers 50 therein. The housing 10 has a back end portion 12 and a front end portion 14. The housing also has at least one passageway 101 extending from the back end portion 12 to the front end portion 14 to accommodate the fibers 50. A single passageway may be configured to handle multiple fibers, or a discrete passageway may be used for each fiber. The connector also comprises a fiber retainer 103 at the back end portion 12. The fiber retainer 103 restricts the fiber's backward movement with respect to the housing 10 when in the mated state. The front end portion 14 is configured to mate with an alignment member 200 (see FIG. 4) such that a fiber in the passageway is received within a passage 230 of the alignment member 200. This particular embodiment of the connector has a number of fiber control features that enhance its performance as an optical coupler.

First, the connector has a specifically configured buckling cavity 16 to control the buckling of the fiber. Specifically, the housing defines the buckling cavity 16 along a first portion 16a of the passageway such that the fiber 50 in the passageway 101 is deflected into the cavity when the connector is in the mated state (see FIG. 6c). The longitudinal cross section of the buckling cavity 16 has a particular profile to limit and control the buckling of the optical fibers 50. In this particular example, the longitudinal cross section of the buckling cavity 16 is trapezoidal with the top wall tapering to end the cavity near the front end portion 14 of the housing. The connector also comprises a barrier 102 along a second portion 102a of the passageway 101. The barrier 102 prevents the fiber 50 from being deflected into the second portion 102a when the connector is in the mated state. The particular shape of the buckling cavity 16 and the barrier 102 ensure that the fibers 50 buckle uniformly, thereby preventing undesirable shifts and rotations at the fiber end faces 51a during the mating/buckling process which may cause the fibers to become misaligned or damage.

Another fiber control feature of the connector embodiment of FIG. 2 is fiber support on at both ends of the connector such that the fiber buckles between the supports. In the particular embodiment of FIG. 2, the back end portion 12 has a fiber retainer 103 which has a first opening 18 through which the passageway 101 extends. The first opening may be a single opening through which multiple fibers pass or it may be a series of discrete opening for accommodating individual fibers. The front end portion 14 comprises a first end face 21 fixed in position relative to the housing 10. The first end face 21 has a second opening 19 through which each passageway 101 extends. Like the first opening 18, the second opening 19 may be a single opening through which multiple fibers pass or it may be a series of discrete opening for accommodating individual fibers. According to this configuration, a fiber in passageway 101 is supported at the back end portion by the retainer 103 and at the front end portion by the first end face 21. The support provided by the two end portions of the optical connector further ensures a uniform buckling of the optical fibers and a PC connection for the optical fibers. Additionally, by supporting the free end of the fiber, rather than having it cantilevered, the connector of the present invention pre-aligns the bare fiber portions 51 for insertion into the alignment member. This pre-alignment facilitates the use of high precision alignment techniques such as V-grooves without the need for extensive "lead in" surfaces.

Yet another fiber control aspect of the connector of FIG. 2 is that the fibers are axially aligned with the V-grooves of the alignment member. As shown in FIGS. 4 and 6c, the alignment member 204 is adjacent the front end portion 16 and has a V-groove 210 axially aligned with every fiber. By axially aligning the fiber with its respective V-groove before mating, all of the buckling force developed during mating is directed axially toward the interface of the fiber and the mating optical pathway, thus increasing PC.

Referring to FIG. 2b, the connector 10 is described below in greater detail. The connector contains optical fibers 50, which are standard optical fibers known in the art and do not require any special treatment or coating. Each of the optical fibers 50 contained in the connector 10 has a portion of its polymeric coating stripped to present a bare fiber portion 51, which is just the core and cladding. In certain embodiment, it may be preferable to round the edge 105 of the fiber end face 104 such that skiving of the alignment member is avoided. Rounding the edges of the fiber end face is preferably achieved using laser cleaving as disclosed in U.S. patent application U.S. application Ser. No. 09/880,698 hereby incorporated by reference.

The back end portion 12 of the housing 10 houses the fiber retainer 103. The fiber retainer may be a discrete device as depicted in FIG. 2 or it may be integral to the housing. It may be any known device for holding a fiber, such as, a clamp, clip, or compression fitting, or it may be simply a part of the housing to which the fiber is adhered. The fiber retainer 103 defines the first opening 18 for receiving the optical fibers 50, while the front end portion 14 includes the second opening 19 through which the optical fibers 50 pass. The front end portion also has receiving area 20 in which the bare fiber portion 51 of the optical fibers 50 are exposed. The first and second openings 18 and 19 of the back and front end portions 12 and 14, respectively, are aligned or substantially aligned with each other to define the passageway 101 therethrough for the fibers 50.

As shown, the connector of the present invention subjects the coated fiber 50, rather than the bare fiber portion 51, to buckling in the buckling cavity 16. Specifically, the first and front end portions 12 and 14 are closed end portions for securely supporting the optical fibers 50 therein. The buckling portions of the optical fibers 50 are located between two portions of the optical fibers 50 which are supported by the first and front end portions 12 and 14. The first and front end portions 12 and 14 further provide control over the optical fibers 50 by stabilizing the position of the bare fiber portions 51.

The receiving area 20 of the front end portion 14 is defined by a first mating face 21 and a shroud 22 that extends beyond the mating face 21 to an end 23. In this embodiment, the bare fibers 51 protrude from the first mating face 21 slightly beyond the end 23 of the shroud 22, although in certain application it may be preferable for the bare fibers not to protrude past the end 23 such that they are protected by the shroud 22. The amount of protrusion of the bare fibers 51 from the first mating face 21 is selected so that, when the connector is mated, the optical fibers 50 physically contact the mating optical pathways and buckle, thereby applying a constant pressure against the mating optical pathway such that PC is maintained. One skilled in the art can determine the desired degree of buckling and thus the desired length of the bare fiber extending from the first mating face 21.

The housing 10 of the optical connector 100 further includes an alignment structure 108 for aligning the first end face 21 with the alignment device 200. In the embodiment of FIG. 1, this alignment structure is a pair of guide holes 26 formed on the first mating face 21 of the housing 10 which cooperate with guide pins 206A (see FIG. 4) on the alignment device 200. Although guide holes and pins are shown on the connector and alignment device, respectively, this arrangement may be reversed, and, further other known alignment structures may be used instead.

Figure 3:
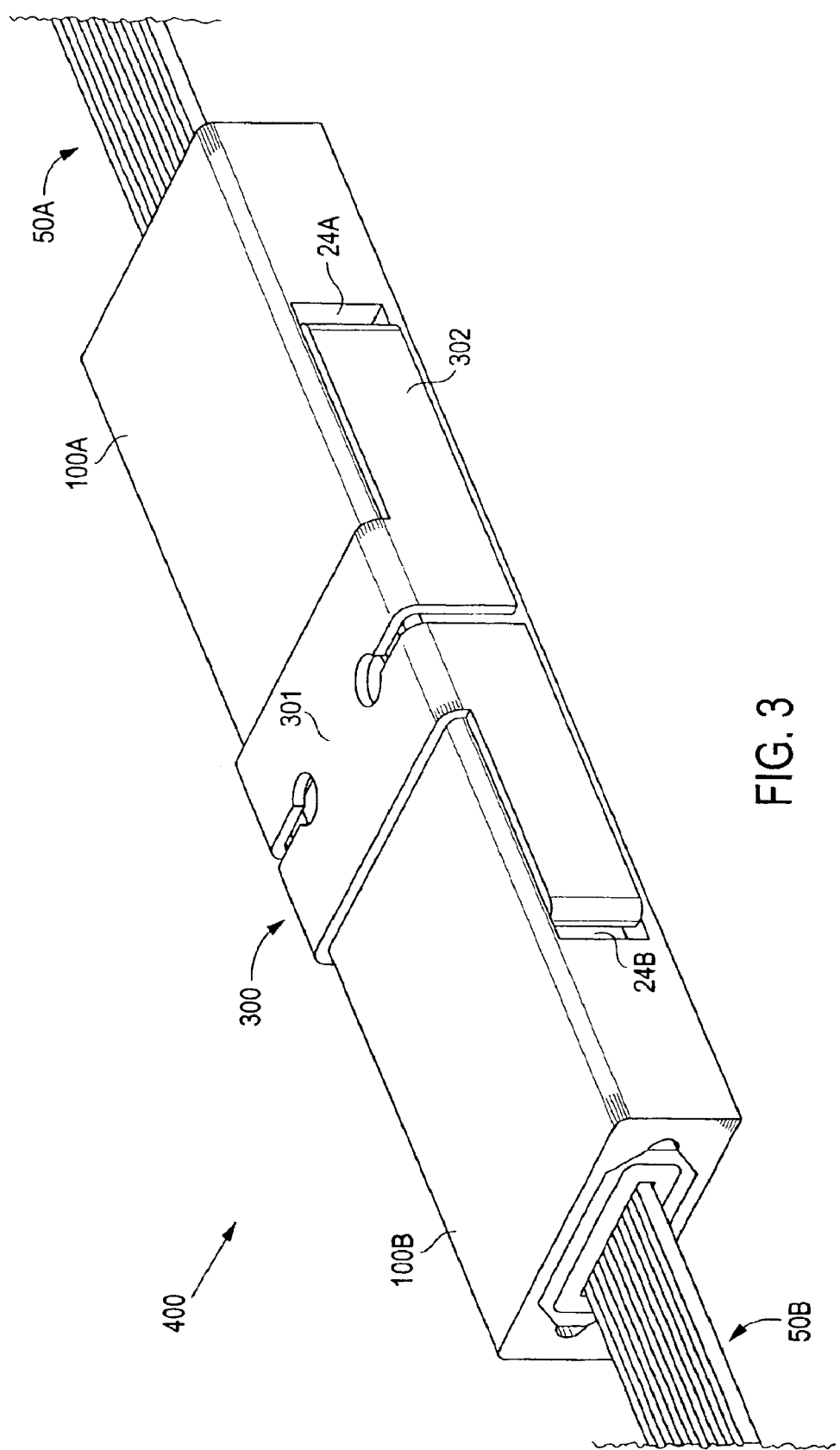
FIG. 3 shows a perspective view of an optical assembly including the optical connectors of FIG. 1 in accordance with the preferred embodiment of the present invention.

Referring to FIG. 3, a perspective view of an optical assembly 400 is shown. The assembly comprises first and second optical connectors 100A, 100B in accordance with the preferred embodiment of the present invention. The optical connectors 100A and 100B depicted in FIG. 3 are the same as the optical connector 100 shown in FIG. 1, and are presumed to have the same structure and parts as the optical connector 100.

The first and second optical connectors 100A and 100B are securely coupled to an alignment device by a fastener 300. In this embodiment, the fastener 300 finds purchase with each connector in openings 24A and B. The first optical connector 100A holds therein first optical fibers 50A and the second optical connector 100B holds therein second optical fibers 50B. The first and second optical fibers 50A are standard optical fibers known in the art and are the same as the optical fibers 50.

The first and second optical connectors 100A and 100B are coupled to the opposite sides of the alignment device 200. FIG. 4 shows a perspective view of an example of the alignment device according to the preferred embodiment of the present invention. As shown in FIG. 4, the alignment device 200 includes a housing 202 having an alignment member 204 and a ridge portion 209, pairs of guide pins 206A and 206B, and a pair of pressing members 208, all operatively connected.

The alignment member 204 can be fixedly inserted into the housing 202 or can be integrally formed as part of the housing 202. The guide pins 206A and 206B can be formed integrally with the housing 202 or fixedly attached to the housing 202. In the alternative, the guide pins 206A and 206B can be formed as two rods passing though the housing 202. The guide pins 206A and 206B are insertable into the guiding holes 26A and 26B of the optical connectors 100A and 100B. The pressing members 208 are pivotally moveable with respect to the ridge portion 209 of the housing 202 and can be securely positioned flush to the ridge portion 209 by snapping them in place using known techniques or by biasing them in place using, for example, a spring or a fastener.

Figure 5B:
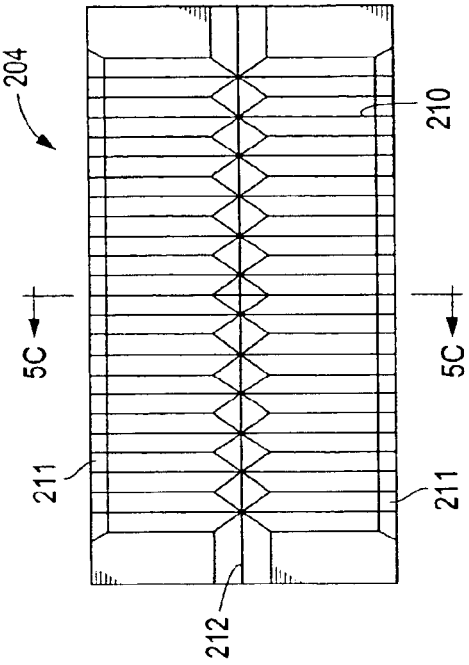
FIG. 5B shows a top view of the alignment member of FIG. 5A.
Figure 5D:
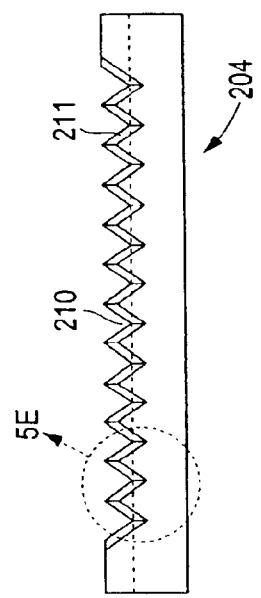
FIG. 5D shows a side view of the V-groove.
Figure 5E:
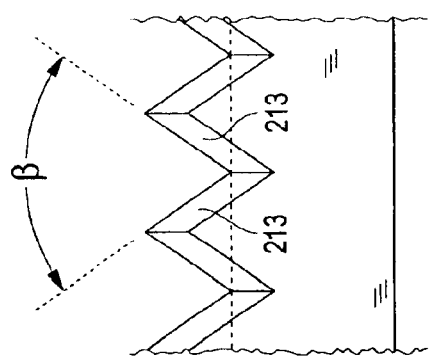
FIG. 5E shows a detail of the V-groove shown in FIG. 5D.
Figure 5A:
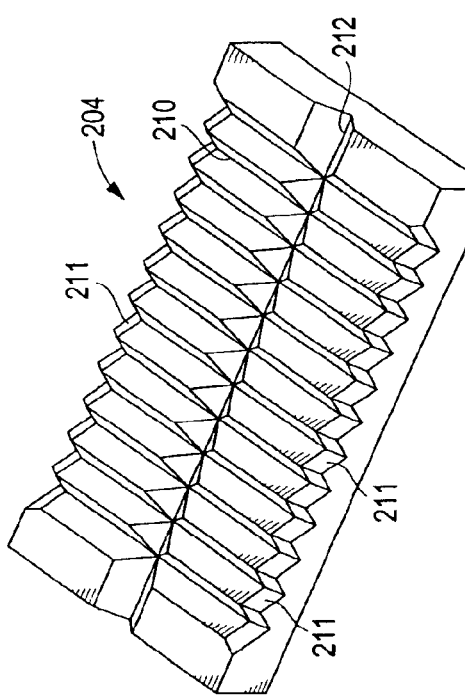
FIG. 5A shows a perspective view of an example of an alignment member of the alignment device shown in FIG. 4.
Figure 5C:
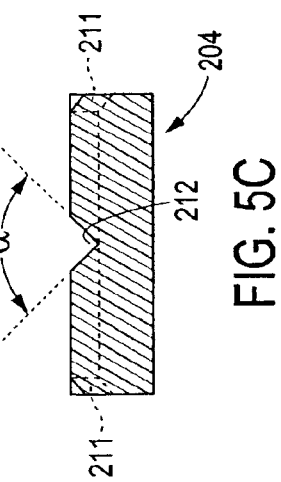
FIG. 5C shows a cross sectional view of the transverse groove.

FIG. 5A shows a perspective view of an example of the alignment member 204 of the alignment device 200 and FIG. 5B shows a top view of the alignment member 204 shown in FIG. 5A. As shown in FIGS. 5A and 5B, the alignment member 204 includes the V-grooves 210 formed in the longitudinal direction of the optical fibers and a transverse V-groove 212 extending in the direction transverse to the longitudinal direction of the V-grooves 210. That is, the transverse V-groove 212 is formed across the middle portion of the V-grooves 210. The transverse V-groove 212 is formed in the middle portion of the V-grooves 210 since the mating of the optical fibers generally occurs in the middle portion of the V-grooves 210. It is preferred that the transverse V-grove 212 be located in the area where the optical fibers come together and mate.

The function of the transverse V-groove 212 is to collect dust, dirt, fragments, particles or any material which can interfere with the mating of the optical fibers. These materials naturally or inadvertently introduced into the alignment member 204 and deposited in the V-grooves 210 and are physical obstructions to the optical fibers because they can block the path of the optical fibers moving along the V-grooves 210 during the mating process of the optical fibers. The deposited materials thus hinder the PC connection of the fibers and can damage the tips of the fibers by causing the fibers to rotate and scratch each other.

When the optical fibers move along the V-grooves 210, the optical fibers sweep any deposited materials formed in the V-grooves 210 and move them to the middle portion of the alignment member 204 where the optical fibers come together. Because of the extra spaces created by the transverse V-groove 212 between the V-grooves 210, the deposited materials are directed to the transverse V-groove 212 away from the tips of the optical fibers. This prevents the deposited materials from hindering the actual mating of the optical fibers and ensures the PC connection of the optical fibers. Preferably, the transverse V-grove 212 has an angle α which is greater than the angle β of the V-grooves 210. In one embodiment, the angle α is 90° or approximately 90° as shown in FIG. 2C.

Each of the V-grooves 210 includes an inlet portion 211 at its opposite ends. FIG. 2D shows a side view of the alignment member 204 and FIG. 2E shows an enlarged view of one inlet portion 211. As shown in FIGS. 2D and 2E, the inlet portion 211 has a fan shape and slanted faces 213 for more easily receiving the optical fibers. In one embodiment, the angle β of the V-grooves 210 is 70.6° or approximately 70.6° as shown in FIG. 2E.

The V-grooves 210 can be separated from each other by flat platform surfaces. The pressing members 208A and 208B can press against the platform surfaces of the V-grooves 210. Preferably, the depth of the V-grooves 210 is greater than the diameter of the bare fibers of the optical fibers so that the entire bare fibers can be contained within the V-grooves 210. With this configuration, the bare fibers can be encapsulated in the V-grooves 210 when the pressing members 208A and 208B abut against the platform surfaces of the V-grooves 210. This way, the bare fibers are securely positioned in the V-grooves 210 with a minimum possibility of being shifted out of the V-grooves 210. Furthermore, this configuration adds more control to the movement of the optical fibers in the V-grooves 210 during the mating process of the fibers.

The V-groove 212 and/or V-grooves 210 can be formed with epoxy, silicon or any material used in the art. Alternatively, the V-groove 212 and/or V-groove 210 can be etched directly onto the body 202 or can be fixedly mounted on the body 202.

It should be understood that the alignment device 200 is merely an example and that the optical connectors 100A and 100B of the present invention are suitable to mate with different alignment devices.

Referring to FIG. 3, the fastener 300 of the optical assembly 400 includes a middle portion 301 and sidebars 302 formed on the opposites sides of the middle portion 301. The sidebars 302 are designed to be inserted into the fastening holes 24A and 24B of the first and second optical connectors 100A and 100B. The fastener 300 can be formed with plastics, metal or any material that is strong enough to hold the optical connectors 100A and 100B together. Although one exemplary shape of the fastener 300 is shown, the fastener 300 may have different shapes and configurations.

To establish a PC connection between the first optical fibers 50A and the second optical fibers 50A, the following operation is performed to form the optical assembly 400. FIGS. 6A and 6B respectively show top and side views of the optical assembly shown in FIG. 3 and FIG. 6C shows a cross-sectional view of the optical assembly, cut along line 6C—6C of FIG. 6A.

As shown in FIGS. 6A–6C, the first optical connector 100A provides the first optical fibers 50A and the second optical connector 100B provides the second optical fibers 50B wherein the first and second bare fibers 51A and 51B of the optical fibers 50A and 50B are exposed for mating. The first and second optical connectors 100A and 100B are then simultaneously coupled to the opposite sides of the alignment device 200. The guiding holes 26A of the first optical connector 100A mate with the pair of guide pins 206A at the same time as the guiding holes 26B of the second optical connector 100B mate with the pair of guide pins 206B of the alignment device 200. Once the guide pins 206A and 206B are in the guiding holes 26A and 26B, respectively, the first and second optical connectors 100A and 100B are continuously pushed in toward the alignment device 200. The guide pins 206A and 206B and the guiding holes 26A and 26B guide the first and second bare fibers 51A and 51B to be aligned with the V-grooves 210 of the alignment device 200.

As the first and second optical connectors 100A and 100B approach the alignment device 200, the first and second bare fibers 51A and 51B then enter the inlet portions 211 of the V-grooves 210 from the opposite sides of the alignment member 204. Due to the pre-alignment afforded by the second opening 19 (see FIG. 2) and the shape of the inlet portions 211 (see FIG. 5E), the bare fibers 51A and 51B are easily positioned in the respective V-grooves 210 with minimum error. The first and second bare fibers 51A and 51B move along the respective V-grooves 210 in the longitudinal direction, and the optical fibers 50A and 50B mate with each other and begin buckling in the buckling cavities 16A and 16B of the first and second optical connectors 100A and 100B. The buckling of the optical fibers 50A and 50B results in an axial force being imposed toward their intersection which ensures that the end faces of the bare fibers 51A are in physical contact with the end faces of the bare fibers 51B. The particular shape of the buckling cavities 16A and 16B and the support provided by the first and front end portions 12A, 12B, 14A and 14B limit the first and second optical fibers 50A and 50B to buckle in a uniform direction such that controlled buckling occurs in the optical connectors 100A and 100B and a PC connection is established.

Once the PC connection between the fibers 51A and 51B is established, the fastener 300 is placed over the alignment device 200. The sidebars 302 of the fastener 300 are engaged into the fastening holes 24A and 24B of the first and second optical connectors 100A and 100B. The fastener 300 securely fixes the optical connectors 100A and 100B to remain tightly coupled to the alignment device 200, whereby a PC connection between the first and second bare fibers 51A and 51B in the alignment device 200 is securely maintained.

Accordingly, the present invention, as embodied in an optical connector, an optical assembly, and a coupling method, provides enhanced control over the fibers during the buckling and mating process of optical fibers by providing a buckling cavity having a certain shape for limiting the buckling of the optical fibers in a uniform direction. This feature is advantageously important because it ensures a PC connection of the optical fibers 50. The present invention further provides additional features, such as two closed end portions, which improve the performance and reliability of the connector, assembly and method. The optical connector of the present invention is uniquely structured such that it can be employed as a plug to be directly connected to an opto-electric device, an active device, or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical connector for optically coupling a fiber to an optical pathway of a mating component when in a mated state, said connector comprising:
   a housing having a front end portion and a back end portion, said housing having at least one passageway extending from said back end portion to said front end portion to accommodate at least one fiber, said housing defining a cavity along a first portion of said passageway such that a fiber in said passageway is deflected into said cavity when said connector is in said mated state;
   a barrier along a second portion of said passageway, said barrier preventing a fiber from being deflected into said second portion when said connector is in said mated state;
   a fiber retainer at said back end portion, said fiber retainer adapted to restrict a fiber's backward movement with respect to said housing when in said mated state; and
   said front end portion being configured to mate with an alignment member such that a fiber in said passageway is received within a passage of the alignment member, said front end having a first end face having an opening through which said passageway extends such that a fiber in said passageway is supported at the back end portion by said fiber retainer and at said front end portion by said end face and is deflected between said front and back end portions during mating.

2. The connector of claim 1, wherein said first portion is side of said passageway.

3. The connector of claim 2, wherein said second portion is the other side of said passageway.

4. The connector of claim 1, wherein said barrier is integrally molded to said housing.

5. The connector of claim 1, wherein said barrier is a planar surface.

6. The connector of claim 1, wherein said housing has a single passageway to accommodate multiple fibers.

7. The connector of claim 1, wherein said front end also comprises an alignment structure for cooperating with an alignment member such that a fiber in said passageway is received within a V-groove of the alignment member.

8. The connector of claim 7, wherein said fiber is supported at said back end portion and at said front end when said connector is in an unmated state.

9. The connector of claim 7, wherein said alignment structure is one of either pins or pin-receiving holes.

10. The connector of claim 7, wherein said housing comprises a shroud at said front end, said shroud extending from said first end face and at least partially encompassing said opening.

11. The connector of claim 7, further comprising said alignment member.

12. The connector of claim 11, wherein said alignment member comprises a precision passage for a fiber.

13. The connector of claim 12, wherein said passage is a V-groove.

14. The connector of claim 13, wherein said alignment member comprises a traverse V-groove.

15. The connector of claim 11, wherein said alignment member is integral to said mating component.

16. The connector of claim 15, wherein said mating component is another optical connector.

17. The connector of claim 15, wherein said mating component is an optical device.

18. The connector of claim 1, wherein said optical pathway is a fiber.

19. The connector of claim 1, wherein said optical pathway is a waveguide.

20. The connector of claim 1, wherein said fiber has an end face with rounded edges.

21. The connector of claim 20, wherein said end face is prepared using laser cleaving.

22. The connector of claim 1, further comprising a fiber, said fiber extending through said housing from said back end portion through said first end face.

23. An optical connector for optically coupling a fiber to an optical pathway of a mating component when in a mated state, said connector comprising:
   a housing having a front end portion and a back end portion, said housing having at least one passageway extending from said back end portion to said front end portion to accommodate at least one fiber;
   a fiber retainer at said back end portion, said fiber retainer adapted to restrict a fiber's backward movement with respect to said housing when in said mated state; and
   said front end comprising a first end face fixed in position relative to said housing, said first end face having an opening through which said passageway extends such that a fiber in said passageway is supported at the back end portion by said fiber retainer and at said front end portion by said end face and is deflected between said front and back end portions during mating, said front end also comprising an alignment structure for cooperating with an alignment member such that a fiber in said passageway is received within a V-groove of the alignment member.

24. The connector of claim 23, further comprising a fiber, said fiber extending through said housing from said back end portion through said first end face.

25. The connector of claim 23, wherein said alignment structure is one of either pins or pin-receiving holes.

26. The connector of claim 23, wherein said housing comprises a shroud at said front end, said shroud extending from said first end face and at least partially encompassing said opening.

27. The connector of claim 23, wherein said fiber extends from said end face but not beyond said shroud when said connector is unmated.

28. The connector of claim 23, further comprising said alignment member.

29. The connector of claim 28, wherein said alignment member comprises a precision passage for a fiber.

30. The connector of claim 29, wherein said passage is a V-groove.

31. The connector of claim 30, wherein said alignment member comprises a traverse v-groove.

32. The connector of claim 23, wherein said alignment member is integral to said mating component.

33. The connector of claim 32, wherein said mating component is another optical connector.

34. The connector of claim 32, wherein said mating component is an optical device.

35. The connector of claim 23, wherein said optical pathway is a fiber.

36. The connector of claim 23, wherein said optical pathway is a waveguide.

37. The connector of claim 23, wherein said fiber has an end face with rounded edges.

38. The connector of claim 37, wherein said end face is prepared using laser cleaving.

39. An optical connector for optically coupling a fiber to an optical pathway of a mating component when in a mated state, said connector comprising:

a housing having a front end portion and a back end portion, said housing having at least one passageway extending from said back end portion to said front end portion to accommodate a fiber, a fiber retainer at said back end portion, said fiber retainer adapted to restrict a fiber's backward movement with inspect to said housing when in said mated state;

said front end portion having a first end face having an opening through which said passageway extends such that a fiber in said passageway is supported at the back end portion by said fiber retainer and at said front end portion by said end face and is deflected between said front and back end portions during mating and comprising a first alignment structure for cooperating with an alignment member such that a fiber in said passageway is received within a V-groove of the alignment member; and an alignment member adjacent said front end portion and having a V-groove axially aligned with every fiber in said housing, said alignment member having a second alignment structure for aligning said V-groove with the optical pathway of the mating component.

* * * * *